US012106922B2

(12) United States Patent
Rozman et al.

(10) Patent No.: US 12,106,922 B2
(45) Date of Patent: Oct. 1, 2024

(54) FUSE ASSEMBLIES AND PROTECTIVE CIRCUITS AND METHODS INCLUDING SAME

(71) Applicant: RIPD IP DEVELOPMENT LTD., Nicosia (CY)

(72) Inventors: Robert Rozman, Smlednik (SI); Zumret Topčagić, Ljubljana (SI)

(73) Assignee: RIPD IP DEVELOPMENT LTD., Nicosia (CY)

( * ) Notice: Subject to any disclaimer, the term of this patent is extended or adjusted under 35 U.S.C. 154(b) by 119 days.

(21) Appl. No.: 17/716,265

(22) Filed: Apr. 8, 2022

(65) Prior Publication Data

US 2023/0326701 A1 Oct. 12, 2023

(51) Int. Cl.
*H01H 85/143* (2006.01)
*H01H 85/055* (2006.01)
*H01H 85/165* (2006.01)

(52) U.S. Cl.
CPC ........ *H01H 85/165* (2013.01); *H01H 85/055* (2013.01); *H01H 85/143* (2013.01)

(58) Field of Classification Search
CPC ... H01H 85/055; H01H 85/165; H01H 85/143
See application file for complete search history.

(56) References Cited

U.S. PATENT DOCUMENTS 2,326,074 A 8/1943 Joseph
2,365,518 A 12/1944 Berkey et al.
2,562,692 A 7/1951 Bigwood
3,267,240 A 8/1966 Fitzgerald
3,296,518 A * 1/1967 Stumpe .................. H02H 3/023 361/13
3,735,317 A * 5/1973 Jacobs, Jr. ........... H01H 85/055 337/296
3,810,063 A 5/1974 Blewitt
4,158,869 A 6/1979 Gilberts
4,168,514 A 9/1979 Howell
4,190,733 A 2/1980 Wootton
4,491,893 A 1/1985 Toda
5,493,469 A 2/1996 Lace
(Continued)

FOREIGN PATENT DOCUMENTS

CZ 12200 U1 6/2002
DE 3049094 A1 7/1982
(Continued)

OTHER PUBLICATIONS

"Increased Safety for Switchgear Cabinets" data sheet, Dehn International (12 pages) (2017).
(Continued)

*Primary Examiner* — Jacob R Crum
(74) *Attorney, Agent, or Firm* — Myers Bigel, P.A.

(57) ABSTRACT

An electrical fuse assembly includes a housing defining a hermetically sealed chamber, first and second terminal electrodes mounted on the housing, a gas contained in the hermetically sealed chamber, a fuse element electrically connecting the first and second terminal electrodes, and at least one spark gap between the first and second terminal electrodes. The fuse element and the at least one spark gap are disposed in the hermetically sealed chamber.

13 Claims, 14 Drawing Sheets

(56) References Cited

U.S. PATENT DOCUMENTS

| | | | | |
|---|---|---|---|---|
| 5,933,310 | A | 8/1999 | Eggendorfer | |
| 7,053,536 | B1 | 5/2006 | Boman et al. | |
| 7,570,473 | B2 | 8/2009 | Adachi et al. | |
| 7,604,754 | B2 | 10/2009 | Summers | |
| 7,643,265 | B2 | 1/2010 | Loader et al. | |
| 7,660,095 | B2 | 2/2010 | Shato et al. | |
| 7,719,815 | B2 | 5/2010 | Shato et al. | |
| 7,937,825 | B2 | 5/2011 | Shato et al. | |
| 8,743,525 | B2 | 6/2014 | Xepapas et al. | |
| 10,186,842 | B2 | 1/2019 | Rozman | |
| 10,319,545 | B2 | 6/2019 | Kamensek et al. | |
| 10,340,110 | B2 | 7/2019 | Vrhunc et al. | |
| 10,679,814 | B2 | 6/2020 | Vrhunc et al. | |
| 10,685,767 | B2 | 6/2020 | Kamensek et al. | |
| 10,685,805 | B2 | 6/2020 | Rozman | |
| 10,734,176 | B2 | 8/2020 | Kamensek et al. | |
| 2001/0022716 | A1 | 9/2001 | Glaser et al. | |
| 2001/0055187 | A1 | 12/2001 | McLoughlin et al. | |
| 2005/0168889 | A1 | 8/2005 | Halvarsson et al. | |
| 2006/0250208 | A1 | 11/2006 | Yu | |
| 2007/0103823 | A1 | 5/2007 | Piasecki et al. | |
| 2009/0323244 | A1 | 12/2009 | Hoopes | |
| 2011/0013330 | A1 | 1/2011 | Crevenat et al. | |
| 2011/0205011 | A1 | 8/2011 | Ehrhardt et al. | |
| 2013/0200986 | A1 | 8/2013 | Koprivsek | |
| 2013/0278129 | A1 | 10/2013 | Krauss et al. | |
| 2014/0092514 | A1 | 4/2014 | Chen | |
| 2014/0133057 | A1 | 5/2014 | Durth et al. | |
| 2016/0035529 | A1 * | 2/2016 | Durth | H01H 85/20 337/18 |
| 2017/0236674 | A1 * | 8/2017 | Durth | H01H 85/38 337/31 |
| 2017/0288371 | A1 | 10/2017 | Robert | |
| 2018/0151318 | A1 | 5/2018 | Kamensek et al. | |
| 2018/0330908 | A1 | 11/2018 | Vrhunc et al. | |
| 2019/0080826 | A1 | 3/2019 | Kamensek et al. | |
| 2019/0252142 | A1 | 8/2019 | Kamensek et al. | |
| 2019/0267206 | A1 | 8/2019 | Vrhunc et al. | |
| 2020/0036185 | A1 | 1/2020 | Tsovilis et al. | |
| 2020/0161073 | A1 * | 5/2020 | Rozman | H01J 11/22 |

FOREIGN PATENT DOCUMENTS

| | | | | |
|---|---|---|---|---|
| DE | 19755082 | A1 | | 6/1999 |
| DE | 29724817 | U1 | | 4/2004 |
| DE | 102011102864 | A1 | | 4/2012 |
| DE | 202019102722 | U1 | | 8/2019 |
| DE | 102019112674 | A8 | | 8/2020 |
| EP | 0905840 | A1 | | 3/1999 |
| EP | 1075064 | A1 | | 2/2001 |
| EP | 2573885 | A1 | | 3/2013 |
| EP | 3166193 | A1 | | 5/2017 |
| EP | 3654464 | A1 | | 5/2020 |
| FR | 2451628 | A1 | | 10/1980 |
| FR | 2991117 | B3 | | 12/2014 |
| GB | 352756 | A | | 7/1931 |
| GB | 987386 | A | * | 3/1965 |
| GB | 1107937 | A | * | 3/1968 |
| GB | 2116362 | A | | 9/1983 |
| KR | 101141915 | B1 | | 5/2012 |
| WO | 2010086286 | A1 | | 8/2010 |
| WO | 2017129291 | A1 | | 8/2017 |

OTHER PUBLICATIONS

OptiFuse—Total Clearing Time, Retrieved from: https://www.optifuse.com/blog/t100120.php, Retrieved on: Nov. 24, 2020 (2 pages).

"Gas Discharge Tubes—GDT" Iskra Zašcite (2 pages) (Jul. 4, 2014).

"Gas-filled tube" Wikipedia, retrieved from: http://en.wikipedia.org/wiki/Gas-filled_tube (9 pages) (Retrieved on: Jan. 20, 2015).

Translation of DIN-Standards, Built-In Equipment for Electrical Installations; Overall Dimensions and Related Mounting Dimensions (15 pages) (Dec. 1988).

"Thermostatic Bimetals" Auerhammer Metallwerk GMBH (8 pages) (2012).

Extended European Search Report Corresponding to European Application No. 23156622.5 (9 pages) (Aug. 23, 2023).

* cited by examiner

FUSE ASSEMBLIES AND PROTECTIVE CIRCUITS AND METHODS INCLUDING SAME

FIELD

The present invention relates to circuit protection devices and, more particularly, to electrical fuses.

BACKGROUND

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges is not acceptable and resulting downtime may be very costly.

SUMMARY

According to a first aspect, an electrical fuse assembly includes a housing defining a hermetically sealed chamber, first and second terminal electrodes mounted on the housing, a gas contained in the hermetically sealed chamber, a fuse element electrically connecting the first and second terminal electrodes, and at least one spark gap between the first and second terminal electrodes. The fuse element and the at least one spark gap are disposed in the hermetically sealed chamber.

According to some embodiments, the electrical fuse assembly includes a plurality of inner electrodes serially disposed in the hermetically sealed chamber in spaced apart relation to define a series of spark gaps from the first terminal electrode to the second terminal electrode.

In some embodiments, the plurality of inner electrodes includes at least three electrodes defining at least two spark gaps.

In some embodiments, the fuse element and the inner electrodes are in fluid communication with the gas contained in the hermetically sealed chamber.

According to some embodiments, the fuse element is in electrical contact with the inner electrodes in the hermetically sealed chamber.

According to some embodiments, the plurality of inner electrodes define a series of cells each containing a respective one of the plurality of the spark gaps, and an inner surface of the fuse element is contiguous with the cells.

According to a second aspect, a protected electrical power supply circuit comprising a surge protective device (SPD) and a fuse assembly connected in electrical series with the SPD. The fuse assembly includes: a housing defining a hermetically sealed chamber; first and second terminal electrodes mounted on the housing; a gas contained in the hermetically sealed chamber; a fuse element electrically connecting the first and second terminal electrodes; and at least one spark gap between the first and second terminal electrodes. The fuse element and the at least one spark gap are disposed in the hermetically sealed chamber. The fuse element is configured to disintegrate, and thereby interrupt the protected electrical power supply circuit, in response to a short circuit current from the SPD exceeding a prescribed trigger current of the fuse element for at least a prescribed duration.

In some embodiments, the prescribed trigger current is a minimum expected short circuit current delivered by the SPD when the SPD has failed as a short circuit.

According to a third aspect, a fused SPD module includes first and second electrical terminals, a module housing, a surge protective device (SPD) mounted in the module housing; and a fuse assembly connected in electrical series with the SPD. The fuse assembly includes: a housing defining a hermetically sealed chamber; first and second terminal electrodes mounted on the housing; a gas contained in the hermetically sealed chamber; a fuse element electrically connecting the first and second terminal electrodes; and at least one spark gap between the first and second terminal electrodes. The fuse element and the at least one spark gap are disposed in the hermetically sealed chamber.

According to some embodiments, the fused SPD module includes a thermal disconnector in the module housing and connected in series with the SPD, the thermal disconnector mechanism being configured to electrically disconnect the first electrical terminal from the second electrical terminal responsive to a thermal event.

According to a fourth aspect, an electrical fuse assembly includes first and second terminal electrodes, a fuse element electrically connecting the first and second terminal electrodes, and a plurality of inner electrodes serially disposed in spaced apart relation to define a series of spark gaps from the first terminal electrode to the second terminal electrode.

According to some embodiments, the fuse element is in electrical contact with the inner electrodes.

According to a fifth aspect, a protected electrical power supply circuit includes a surge protective device (SPD) and a fuse assembly connected in electrical series with the SPD. The fuse assembly includes: first and second terminal electrodes; a fuse element electrically connecting the first and second terminal electrodes; and a plurality of inner electrodes serially disposed in spaced apart relation to define a series of spark gaps from the first terminal electrode to the second terminal electrode. The fuse element is configured to disintegrate, and thereby interrupt the protected electrical power supply circuit, in response to a short circuit current from the SPD exceeding a prescribed trigger current of the fuse element for at least a prescribed duration.

According to some embodiments, the fuse element is in electrical contact with the inner electrodes.

According to some embodiments, the prescribed trigger current is a minimum expected short circuit current delivered by the SPD when the SPD has failed as a short circuit.

According to a sixth aspect, a fused SPD module includes first and second electrical terminals, a module housing, a surge protective device (SPD) mounted in the module housing, and a fuse assembly connected in electrical series with the SPD. The fuse assembly includes: first and second terminal electrodes; a fuse element electrically connecting the first and second terminal electrodes; and a plurality of inner electrodes serially disposed in spaced apart relation to define a series of spark gaps from the first terminal electrode to the second terminal electrode.

In some embodiments, the fuse element is in electrical contact with the inner electrodes.

According to some embodiments, the fused SPD module includes a thermal disconnector in the module housing and connected in series with the SPD, the thermal disconnector mechanism being configured to electrically disconnect the first electrical terminal from the second electrical terminal responsive to a thermal event.

DETAILED DESCRIPTION

Figure 1:
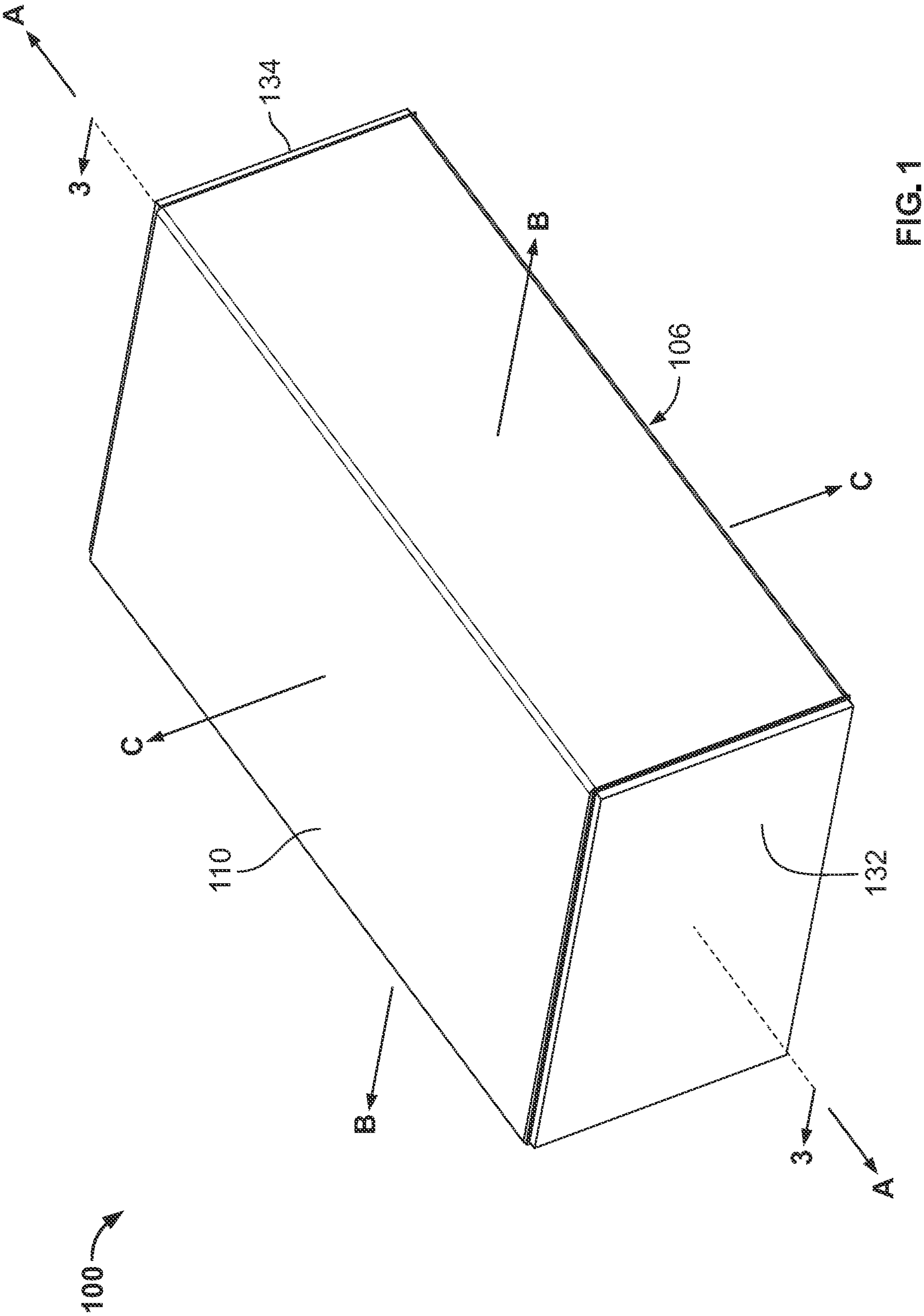
FIG. 1 is a perspective view of a modular electrical fuse assembly according to some embodiments.
Figure 2:
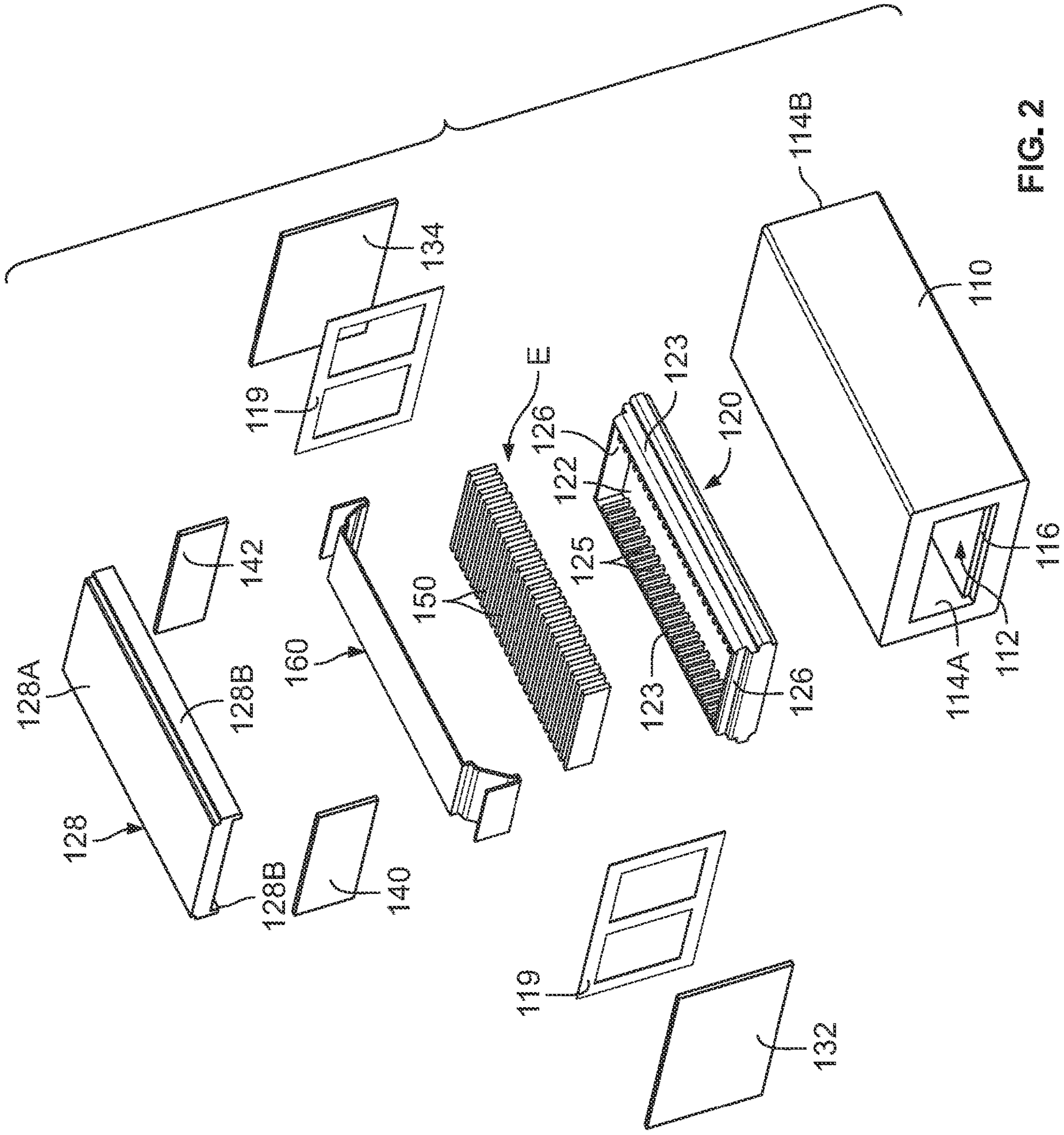
FIG. 2 is an exploded, perspective view of the modular electrical fuse assembly of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It is noted that aspects described with respect to one embodiment may be incorporated in different embodiments although not specifically described relative thereto. That is, all embodiments and/or features of any embodiments can be implemented separately or combined in any way and/or combination. Moreover, other apparatus, methods, and systems according to embodiments of the inventive concept will be or become apparent to one with skill in the art upon review of the following drawings and detailed description. It is intended that all such additional apparatus, methods, and/or systems be included within this description, be within the scope of the present inventive subject matter, and be protected by the accompanying claims.

As used herein, "monolithic" means an object that is a single, unitary piece formed or composed of a material without joints or seams. Alternatively, a unitary object can be a composition composed of multiple parts or components secured together at joints or seams.

As used herein, a "hermetic seal" is a seal that prevents the passage, escape or intrusion of air or other gas through the seal (i.e., airtight). "Hermetically sealed" means that the described void or structure (e.g., chamber) is sealed to prevent the passage, escape or intrusion of air or other gas into or out of the void or structure.

With reference to FIGS. 1-12, a modular electrical fuse device or assembly 100 according to some embodiments is shown therein. The electrical fuse assembly 100 may be provided, installed and used as a component in a protection circuit of a power supply circuit as described below with reference to FIG. 13, to form a protected power supply circuit 281, for example.

The fuse assembly 100 includes a secondary or outer housing 110, a first outer or terminal electrode 132, a second outer or terminal electrode 134, a first shield member 140, a second shield member 142, a set E of inner electrodes E1-E24, bonding layers 119, a locator member, spacer, or base 120, a cover member or cover 128, a selected gas M, and a fuse element 160. The base 120 and the cover 128 collectively form a primary or inner housing 111.

As discussed in more detail below, the fuse assembly 100 includes both a fuse system 102 and a multi-cell spark gap or gas discharge tube (GDT) system 104. In use, the fuse system 102 and the multi-cell spark gap system 102 cooperate to shunt current away from sensitive electronic components in response to overvoltage surge events.

The outer housing 110 is generally tubular and has axially opposed end openings 114A, 114B communicating with a through passage or cavity 112. The housing 110 also includes locator flanges 116 proximate the openings 114A, 114B. The housing 110 and the cavity 112 are rectangular in cross-section.

The housing 110 may be formed of any suitable electrically insulating material. According to some embodiments, the housing 110 is formed of a material having a melting temperature of at least 1000 degrees Celsius and, in some embodiments, at least 1600 degrees Celsius. In some embodiments, the housing 110 is formed of a ceramic. In some embodiments, the housing 110 includes or is formed of alumina ceramic ($Al_2O_3$) and, in some embodiments, at least about 90% $Al_2O_3$. In some embodiments, the housing 110 is monolithic.

The housing 110 and the terminal electrodes 132, 134 collectively form an enclosure or housing assembly 106 defining an enclosed, hermetically sealed fuse assembly chamber 108. The fuse assembly chamber 108 is rectangular in cross-section. The inner electrodes E1-E24, the base 120, the cover 128, the fuse element 160, and the gas M are contained in the hermetically sealed fuse assembly chamber 108.

The inner housing 111 divides the fuse assembly chamber 108 into an arc chamber 107 (within the inner housing 111) and a pair of opposed end chambers 109 (between the ends the inner housing 111 and the terminal electrodes 132, 134). The inner housing 111 defines narrowed end slots 109A connecting the arc chamber 107 to the end chambers 109. Gas flow may be permitted between the end chambers 109 and the arc chamber 107 through the slots 109A, for example. However, it will be appreciated that the end chambers 109 and the arc chamber 107, as parts of the hermetically sealed fuse assembly chamber 108, are each hermetically sealed from the ambient environment.

The housing assembly 106 has a central lengthwise or main axis A-A, a first lateral or widthwise axis B-B perpendicular to the axis A-A, and a second lateral or heightwise axis C-C perpendicular to the axes A-A and B-B.

Figure 6:
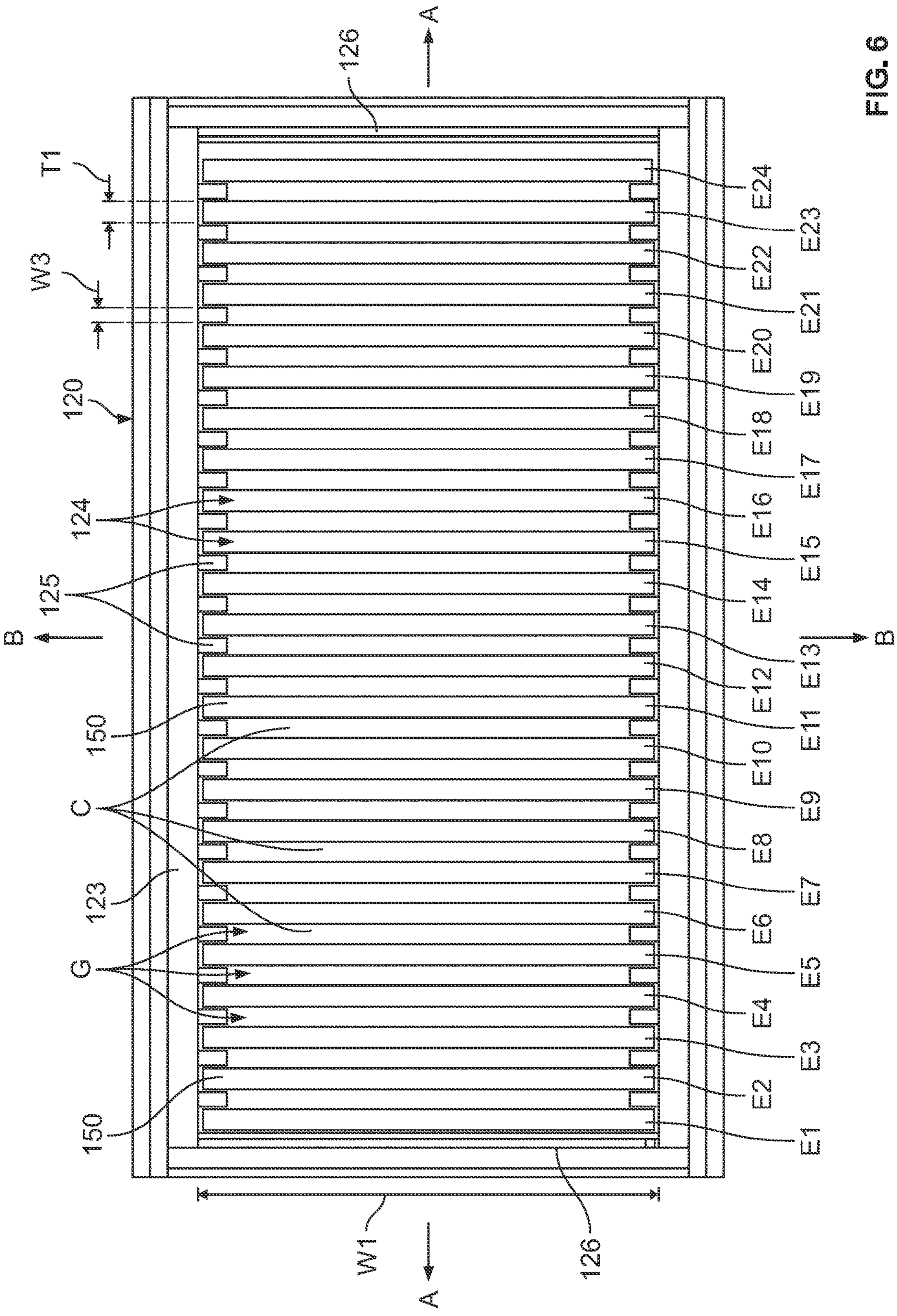
FIG. 6 is a fragmentary, top view of the modular electrical fuse assembly of FIG. 1.
Figure 7:
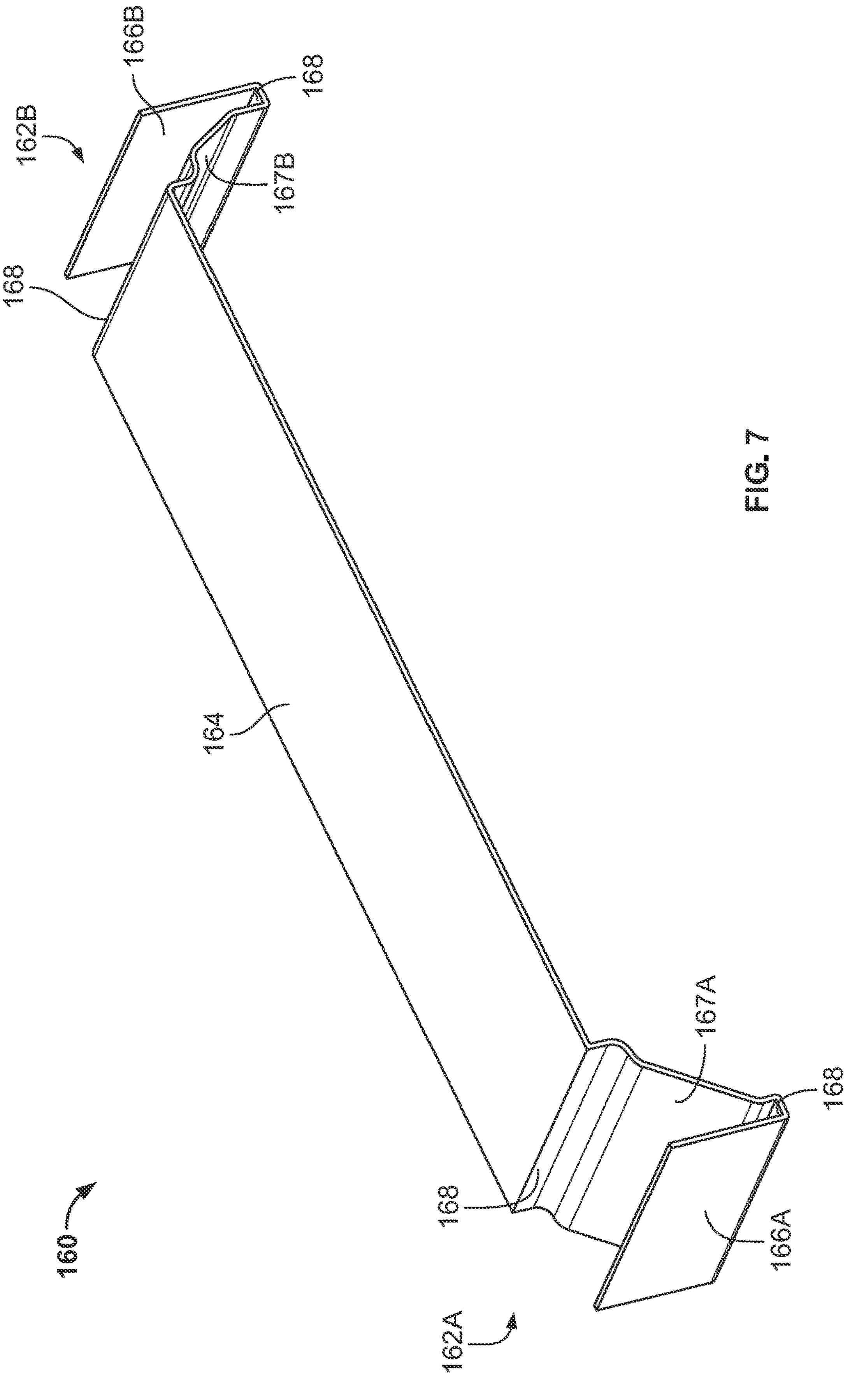
FIG. 7 is a perspective view of a fuse element forming a part of the modular electrical fuse assembly of FIG. 1.
Figure 8:
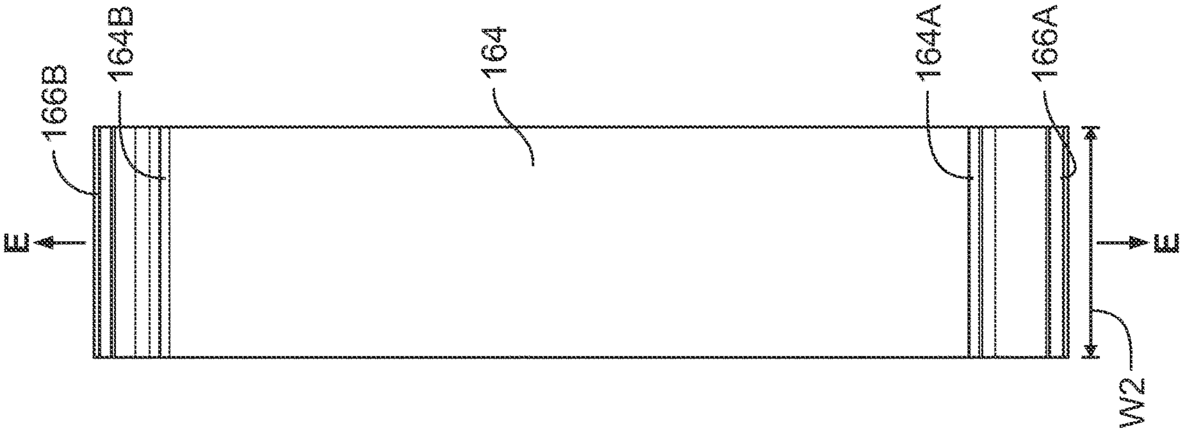
FIG. 8 is a top view of the fuse element of FIG. 7.
Figure 9:
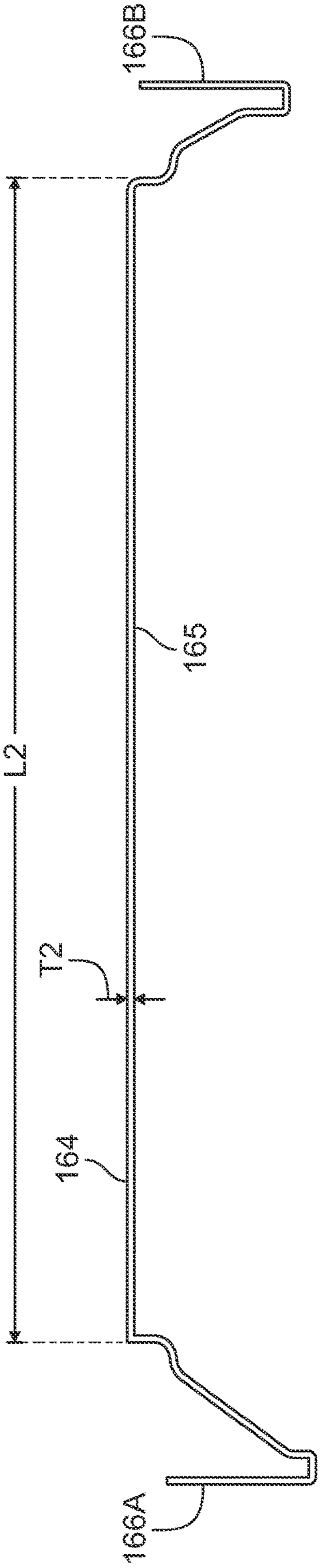
FIG. 9 is a side view of the fuse element of FIG. 7.

As discussed hereinbelow, the electrodes E1-E24 are axially spaced apart to define a plurality of gaps G (twenty-three gaps G) and a plurality of cells C (twenty-three cells C) between the electrodes E1-E24 (FIG. 6). The electrodes E1-E24, the gaps G, and the cells C are serially distributed in spaced apart relation along the axis A-A.

The base 120 includes a body 122, upstanding sidewalls 123, and upstanding end walls 126. The sidewalls 123 each include a plurality of integral ribs 125 defining locator slots 124 projecting laterally inward from the sidewalls 123.

The cover 128 includes a body 128A and upstanding sidewalls 128B.

The base 120 and the cover 128 may be formed of any suitable electrically insulating material. According to some embodiments, the base 120 and the cover 128 are formed of a material having a melting temperature of at least 1000 degrees Celsius and, in some embodiments, at least 1600 degrees Celsius. In some embodiments, each of the base 120 and the cover 128 is formed of a ceramic. In some embodiments, each of the base 120 and the cover 128 includes or is formed of alumina ceramic (Al203) and, in some embodiments, at least about 90% Al203. In some embodiments, the base 120 and the cover 128 are each monolithic.

The terminal electrodes 132, 134 are substantially flat plates each having opposed, substantially parallel planar surfaces 136. The electrodes 132, 134 may be formed of any suitable material. According to some embodiments, the electrodes 132, 134 are formed of metal and, in some embodiments, are formed of molybdenum or Kovar. According to some embodiments, each of the electrodes 132, 134 is unitary and, in some embodiments, monolithic.

The terminal electrodes 132, 134 are secured and sealed by the bonding layers 119 over and covering the openings 114A, 114B. The bonding layers 119 thereby hermetically seal the openings 114A, 114B. In some embodiments, the bonding layers 119 are metallization, solder or metal-based layers. Suitable metal-based materials for forming the bonding layers 119 may include nickel-plated Ma-Mo metallization. Optionally, the openings 114A, 114B may be further hermetically sealed with supplemental seals. Suitable materials for the seals may include a brazing alloy such as silver-copper alloy.

According to some embodiments, each of the electrodes E1-E24 has a thickness T1 (FIG. 6) in the range of from about 0.3 to 1 mm and, in some embodiments, in the range of from about 0.8 to 1.5 mm. According to some embodiments, each electrode E1-E24 has a height H1 (FIG. 5) in the range of from about 2 to 10 mm and, in some embodiments, in the range of from 8 to 20 mm. According to some embodiments, the width W1 (FIG. 6) of each electrode E1-E24 is in the range of from about 4 to 30 mm.

The electrodes E1-E24 may be formed of any suitable material. According to some embodiments, the electrodes E1-E24 are formed of metal and, in some embodiments, are formed of molybdenum, copper, tungsten or steel. According to some embodiments, each of the electrodes E1-E24 is unitary and, in some embodiments, monolithic.

The side edges of the electrodes E1-E24 are seated in opposed slots 124 of the base 120, and the electrodes E1-E24 are thereby semi-fixed or floatingly mounted in the fuse assembly chamber 108. As discussed above, the inner electrodes E1-E24 are serially positioned and distributed in the fuse assembly chamber 108 along the axis A-A. The electrodes E1-E24 are positioned such that each electrode E1-E24 is physically spaced apart from the immediately adjacent other inner electrode(s) E1-E24. The base 120 thereby limits axial displacement (along the axis A-A) and lateral displacement (along the axis B-B) of each electrode E1-E24 relative to the housing 106. Each electrode E1-E24 is also captured between the base 120 and the cover 128 to thereby limit lateral displacement (along axis C-C) of the electrode E1-E24 relative to the inner housing 111.

In this manner, each electrode E1-E24 is positively positioned and retained in position relative to the inner housing 111 and the other electrodes E1-E24. In some embodiments, the electrodes E1-E24 are secured in this manner without the use of additional bonding or fasteners applied to the electrodes E1-E24 or, in some embodiments, to the electrodes E1-E24. The electrodes E1-E24 may be semi-fixed or loosely captured between the base 120 and the cover 128. The electrodes E1-E24 may be capable of floating relative to the inner housing 111 along one or more of the axes A-A, B-B, C-C to a limited degree within the inner housing 111.

The locator features 125 prevent contact between the inner electrodes E1-E24. According to some embodiments, the minimum width W3 (FIG. 6) of each gap G (i.e., the smallest gap distance between the two electrode surfaces forming the cell C) is in the range of from about 0.3 to 1.5 mm. The number of inner electrodes E1-E24 and the gap distance therebetween may be based on the expected voltage across the fuse assembly 100 in a surge event and the normal operating power voltage of a power system.

In some embodiments, the base 120 and the cover 128 fit snuggly against or apply a compressive load to the fuse element 160 and the electrodes E1-E24 so that the fuse element 160 is compressively loaded into contact with electrical coupling edges 150 of the electrodes E1-E24.

The shield members 140, 142 may be formed of any suitable electrically insulating material(s). In some embodiments, the shield members 140, 142 are be formed of ceramic.

The gas M may be any suitable gas, and may be a single gas or a mixture of two or more (e.g., 2, 3, 4, 5, or more) gases. According to some embodiments, the gas M includes at least one inert gas. In some embodiments, the gas M includes at least one gas selected from argon, neon, helium, hydrogen, and/or nitrogen. In some embodiments, the gas M may be air and/or a mixture of gases present in air.

The gas M fills the fuse assembly chamber 108 and the arc chamber 107. In some embodiments, the pressure of the gas M in the fuse assembly chamber 108 and the arc chamber 107 of the assembled fuse assembly 100 is in the range of from about 50 to 2,000 mbar at 20 degrees Celsius.

The fuse element 160 is an elongate layer or strip having opposed first and second ends 162A, 162B. The strip includes an elongate connecting body or leg 164, an integral first tab 166A on the first end 162A, and an integral second tab 166B on the second end 162B. Each tab 166A, 166B is connected to the body 164 by a bridge section 167A, 167B including bends 168.

The body 164 has a lengthwise axis E-E and opposed ends 164A, 164B. In some embodiments and as illustrated, the lengthwise axis E-E is substantially parallel with the axis A-A. In some embodiments and as illustrated, the width W2 of the body 164 is substantially uniform from end 164A to end 164B.

In some embodiments and as illustrated, the body 164 is free of cutouts, holes, or other reductions in its cross-sectional area from end 164A to end 164B.

In other embodiments, holes, cutouts or other reductions in cross-sectional area may be defined in the body 164 to promote initiation of disintegration in those locations.

The fuse element 160 may be formed of any suitable material(s) metals. In some embodiments, the fuse element 160 is formed of copper, iron, or steel.

In some embodiments, the fuse element 160 has a thickness T2 (FIG. 9) in the range of from about 0.08 to 0.35 mm.

In some embodiments, the fuse element 160 has a width W2 (FIG. 8) in the range of from about 1 to 20 mm.

In some embodiments, the fuse element 160 has a length L2 (FIG. 9) in the range of from about 20 to 50 mm.

In some embodiments, the fuse element 160 has a cross-sectional area (in the plane defined by axes B-B and C-C) in the range of from about 0.3 to 4 $mm^2$. The dimensions of the fuse element 160 may be based on the expected voltage across the fuse assembly 100 and/or the expected current through the fuse assembly 100 in a surge event along with the expected current through the fuse element 160 during normal operating conditions.

The fuse body 164 is contained in the arc chamber 107 with the gas M and the inner electrodes E1-E24. The fuse body 164 spans across the full length of the arc chamber 107 between the cover 128 and the electrical coupling edges 150 of the inner electrodes E1-E24. The inner surface 165 of the fuse body 164 faces the electrical coupling edges 150. In some embodiments, the inner surface 165 of the fuse body 164 engages the electrical coupling edges 150 so that the body 164 makes direct electrical contact with some or all of the inner electrodes E1-E24. The inner surface 165 is contiguous with the cells C.

The ends 164A, 164B of the body 164 are positioned in the slots 109A. In some embodiments, the ends 164A, 164B and the slots 109A are relatively sized and configured such that the ends 164A, 164B substantially fill the slots 109A to inhibit or prevent flow of gas and debris from the arc chamber 107 to the chambers 109.

The bridge sections 167A, 167B span the distances from the slots 109A to the terminal electrodes 140, 142. The tab 166A is secured, anchored or affixed to the interior surface of the terminal electrode 132 by a bonding layer 119. The tab 166B is secured, anchored or affixed to the interior surface of the terminal electrode 134 by a bonding layer 119. The tabs 166A, 166B is thereby held in electrical contact with the interior surfaces of the terminal electrodes 132, 134.

The shields 140, 142 are interposed between the tabs 166A, 166B and the end chambers 109.

The fuse assembly 100 may be assembled as follows.

The inner electrodes E1-E24 are seated in the slots 124 of the base 120. The fuse element 160 is laid over and in contact with the upper electrical coupling edges 150 of the inner electrodes E1-E24 to form a subassembly. The cover 128 is installed over this subassembly to form the inner housing 111 containing the inner electrodes E1-E24 and the fuse element 160. The body 164 of the fuse element 160 is positioned such that its inner interface 165 faces and engages the electrical coupling edges 150 of the inner electrodes E1-E24 and faces the top and bottom open sides of the spark gaps G between the inner electrodes E1-E24. More particularly, the inner surface 165 is contiguous with the cells C between the inner electrodes E1-E24 and define, in part, the cells C.

The shield members 140, 142 are inserted in the fuse element bends 168 behind the tabs 166A, 166B.

The subassembly thus constructed is inserted into the cavity 112 through the opening 114B. The bonding layers 119 are heated to bond the terminal electrodes 132, 134 to the outer housing 110 over the openings 114A, 114B and hermetically seal the openings 114A, 114B. According to some embodiments, the seals 118 are metal solder or brazings, which may be formed of silver-copper alloy, for example.

The fuse assembly 100 may be used as follows in accordance with some embodiments. The fuse assembly 100 is connected in a circuit (e.g., a circuit 281 as described below) via the terminal electrodes 132, 134 such a voltage is applied across the fuse assembly 100 between the terminal electrodes 132, 134.

Under normal conditions (i.e., in the absence of an overcurrent event), current flows through the fuse element 160 from the terminal electrode 132 to the terminal electrode 134. The fuse element 160 may configured such that a current within the rated operation current of the fuse assembly 100 does not generate sufficient heat in the fuse element 160 to burn, dissolve, or otherwise disintegrate the fuse element 160. Accordingly, under these conditions, the fuse assembly 100 operates as an electrical conductor component.

As described in more detail below, when the fuse assembly 100 is subjected to an overcurrent, the fuse element 160 is disintegrated (e.g., melts, evaporates, or dissolves), at least in part, by the energy from the current conducted through the fuse element 160, and one or more arcs or sparks will be generated in one or more of the cells C between the inner electrodes E1-E24. As the fuse element 160 continues to disintegrate, the arcs propagate into additional cells C until reaching a total arc voltage (e.g., approximately 500-700 volts) based on the surge event voltage. The number of electrodes E1-E24 and the spacings therebetween may be chosen such that the total arc voltage exceeds the normal operating voltage, which ensures that the arcing in the fuse assembly 100 is extinguished once the surge event terminates and the voltage across the fuse assembly returns to normal operating levels.

Figure 10:
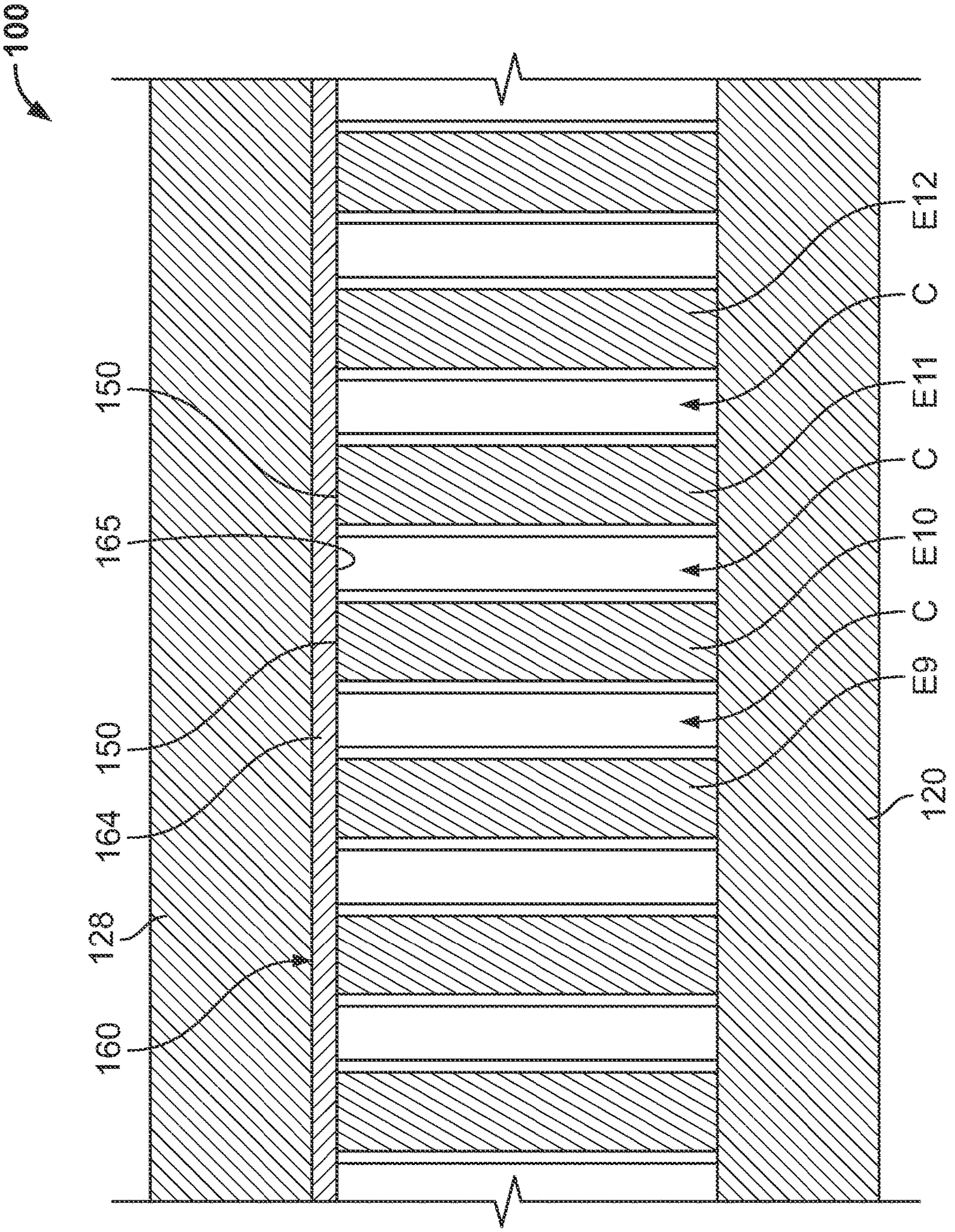
FIGS. 10-12 are enlarged, fragmentary, cross-sectional views of the modular electrical fuse assembly of FIG. 1 taken along the line 3-3 of FIG. 1 illustrating operation of the modular electrical fuse assembly.

FIG. 10 shows the fuse assembly 100 during normal operation.

Figure 11:
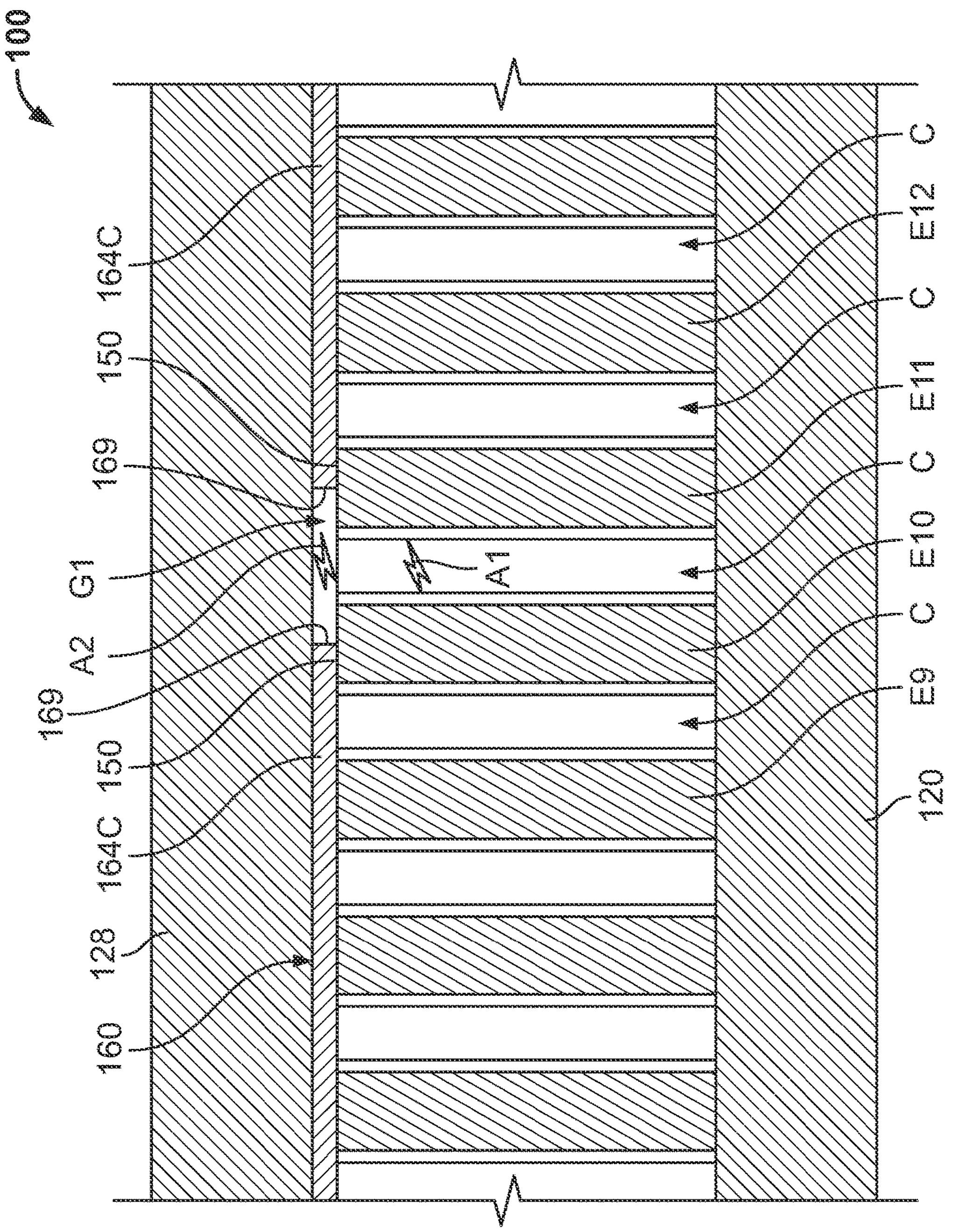

FIG. 11 shows the fuse assembly 100 at the beginning of an overcurrent event. As illustrated therein, the overcurrent energy has disintegrated a portion of the fuse body 164 so that a gap G1 is formed axially between opposed ends 165 of two remaining sections 164C of the body 164.

Because the fuse element 160 is now discontinuous, a spark or arc A1 will form between the inner electrodes E10 and E11 in the cell C below the gap G1. The arc A1 is fed by the current supplied from the remaining sections 164C, which are in electrical contact with the inner electrodes E10 and E11, respectively. An arc A2 may also form between the ends 169. Thus, at least a portion of the current and energy that would ordinarily support an arc between the fuse element ends 169 is instead transferred to the inner electrodes E10, E11 to form the arc between the electrodes E10 and E11. In some embodiments, this current is transferred to one or both of the electrodes E10, E11 by electrical conduction from the fuse element 160 to the electrode(s) E10, E11. In some embodiments, this current is transferred to one or both of the electrodes E10, E11 by arcing from the fuse element 160 to the electrode(s) E10, E11. In some embodiments, this current is transferred to one or both of the electrodes E10, E11 by both conduction and arcing from the fuse element 160 to the electrode(s) E10, E11. In some embodiments, the arc or current will be transferred substantially instantaneously from the fuse element 160 to the inner electrodes because the fuse element 160 is in contact with the inner electrodes E1-E24.

Figure 12:
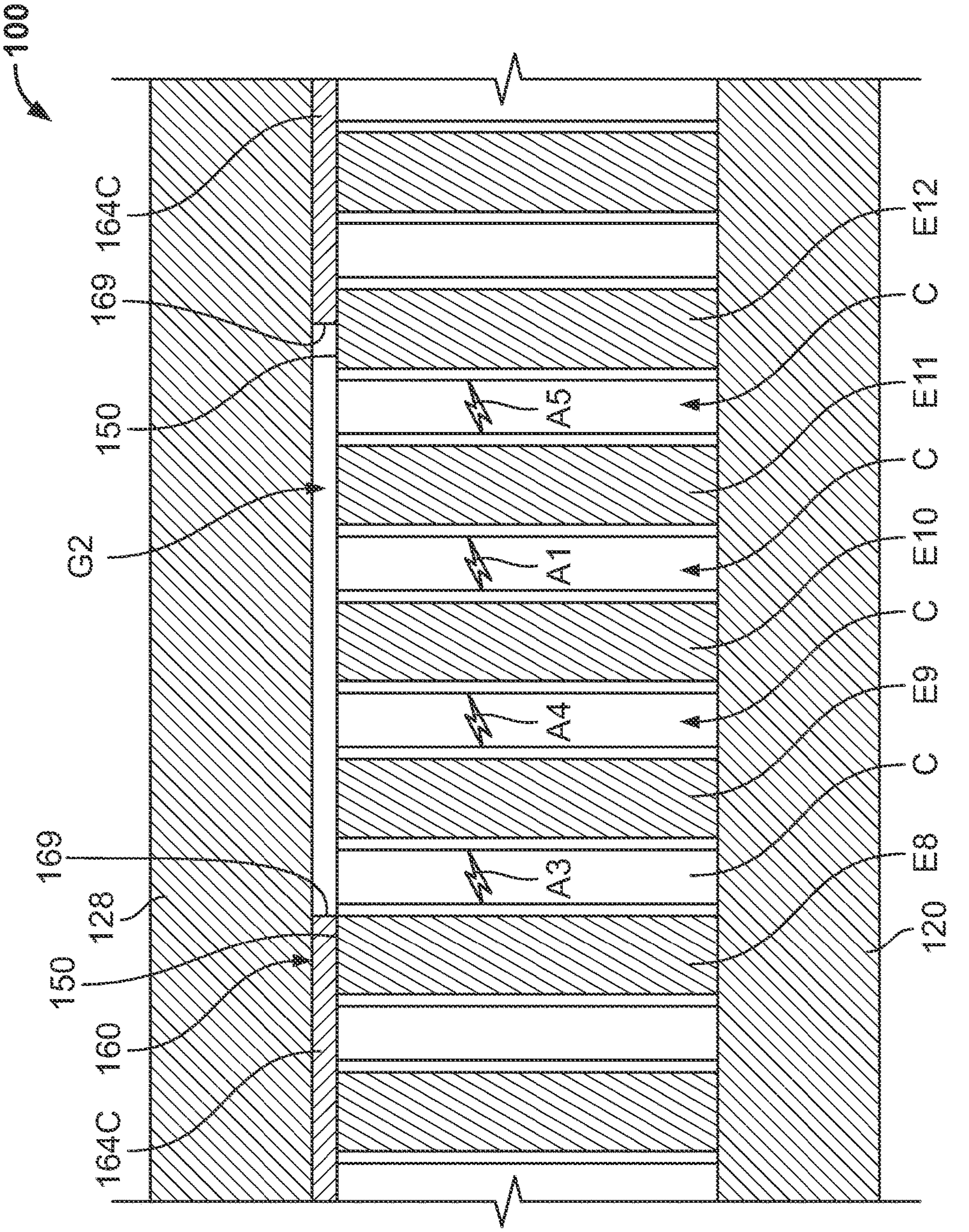

Referring to FIG. 12, the overcurrent energy may then disintegrate more of the fuse body 164 so that a larger gap G2 is formed axially between opposed ends 169 of two remaining sections 164C of the body 164. Additional sparks or arcs A3, A4, A5 will form between the inner electrodes E8 and E9, between the inner electrodes E9 and E10, and between the inner electrodes E11 and E12 in the cells C below the gap G2. The arcs A3, A4, A5 are likewise fed by the current supplied from the remaining sections 164C, which are in electrical contact with the inner electrodes E8 and E12, respectively.

The overcurrent energy may then disintegrate more of the fuse body 164, responsive to which arcs are formed across more of the cells C. That is, as the fuse body 164 is disintegrated, sparks are propagated across additional cells C. While the progression of the fuse element gap and the progression of the arcing in the cells C has been shown and described with reference to a single disintegration location, in practice the fuse element 160 may be disintegrated in more than one location, and as a result arcing may occur in cells C that are not immediately adjacent.

The disintegration of the fuse element 160 and the propagation of arcs across more cells C will continue until the entire fuse body 164 has disintegrated or the voltage or the overvoltage event completes resulting in the current through the fuse assembly 100 dissipating leaving portions of the fuse body 164 still intact.

In some embodiments, the fuse element 160 is constructed such that substantially the entire body 164 will disintegrate quickly after disintegration is initiated. As a result, arcing will be quickly generated across enough cells C to increase the overall arc voltage and stop the current flow when the normal operating voltage across the fuse assembly is less than the overall arc voltage. In some embodiments, the substantially the entire body 164 will be disintegrated (dissolved or evaporated) within 0.1 to 1.5 milliseconds.

In will be appreciated that the inner electrodes E1-E24 will be able to hold the arcs in the cells C and the current flow without major damage to the inner electrodes or catastrophic damage to the fuse assembly 100 because the inner electrodes E1-E24 have a high melting point compared to that of the fuse element 160. In some embodiments, the inner electrodes E1-E24 are formed from a material having a melting point that is at least 1.5 to 3.0 times the melting point of the material from which the fuse body 164 is made. In some embodiments, the fuse body 164 is formed from copper (which melts at about 1000 degrees C.) and the inner electrodes E1-E24 are made of molybdenum (which melts at about 2700 degrees C.).

The voltage developed across each cell C is based on the voltage across the fuse assembly during an overvoltage event. In some embodiments in which the voltage developed across the fuse assembly 100 is approximately 500-700 volts and there are 25 individual cells C, the voltage developed across each cell C is in the range of from about 20 volts to 30 volts. The voltage developed across each cell C can be tuned by selection of the total number of the cells C, the spacing between the inner electrodes E1-E24, and the selection of the composition of the gas M.

As described herein, the fuse assembly 100 may be tuned based on the expected continuous operating voltage. This tuning may involve selecting a number of inner electrodes E1-E24, the dimensions of the inner electrodes E1-E24 (widths and thicknesses), and the spacing between the inner electrodes E1-E24. The material used for forming the inner electrodes E1-E24 may be chosen to ensure that the inner electrodes are not damaged due to carrying high current. In some embodiments, the number of inner electrodes E1-E24 and the spacing therebetween may be chosen such that the total arc voltage, which is the sum of the arc voltages between pairs of the inner electrodes E1-E24, is greater than the voltage developed across the fuse assembly during normal operation, i.e., after the overcurrent event has ended. For example, the fuse assembly 100 may be designed so as to have 26 inner electrodes resulting in 25 different voltage arcs. In an overcurrent event, 500-700 volts may be developed across the fuse assembly 100 and each voltage arc may be approximately 20 volts. The normal operating voltage, however, may be based on a 255 volt AC system. Thus, once the overcurrent event terminates, the total arc voltage across the inner electrodes is much greater than the normal operating voltage across the fuse assembly 100 resulting in a rapid dissipation of the of the current through the fuse assembly. The number of inner electrodes and spacing therebetween ensures that voltage arcs are not created when voltage across the fuse assembly drops from the higher surge event voltage level to the lower normal operating condition voltage level. If the number of the inner electrodes and/or the spacing therebetween is such that the total arc total voltage of the arcs developed between the inner electrodes does not exceed the normal operating voltage developed across the fuse assembly 100, then the fuse assembly may continue to conduct current after the overcurrent event has passed and another mechanism may be required to terminate the surge current.

The outer housing 110 can reinforce the inner housing 111 to ensure that the fuse element 160 remains in close contact with the inner electrodes E1-E24.

The narrowed slots 109A can help to inhibit gases and liquids from escaping the arc chamber 107 into the end chambers 109 when the fuse element body 164 disintegrates.

The end chambers 109 provide an enlarged DC spark over gap to increase the resistance of the fuse assembly 100 to reignition (after the fuse has blown). The shields 140, 142 can protect the terminal electrodes 132, 134 from gases and liquids when the fuse element body 164 disintegrates, which may help to increase the resistance of the fuse assembly 100 to reignition.

While the fuse assembly 100 has been shown and described herein having certain numbers of inner electrodes (e.g., electrodes E1-E24), fuse assemblies according to embodiments of the invention may have more or fewer inner electrodes as described above. According to some embodiments, a fuse assembly 100 as disclosed herein has at least 20 inner electrodes defining at least 21 spark gaps G and, in some embodiments, at least 30 inner electrodes defining at least 31 spark gaps G. According to some embodiments, a fuse assembly as disclosed herein has in the range of from 15 to 40 (or more) inner electrodes.

According to further embodiments, a fuse assembly as disclosed herein includes only a single spark gap between the ends 164A, 164B of the fuse element 160 or between the terminal electrodes 132, 134. In this case, the spark gap may be defined by and between the terminal electrodes 132, 134 with no inner electrodes present in the fuse assembly. This spark gap is likewise contained in the hermetically sealed arc chamber with the fuse element and the gas M.

Typically, sensitive electronic equipment may be protected against transient overvoltages and surge currents using surge protective devices (SPDs). For example, an overvoltage protection device may be installed at a power input of equipment to be protected, which is typically protected against overcurrents when it fails. Typical failure mode of an SPD is a short circuit. The overcurrent protection typically used is a combination of an internal thermal disconnector to protect the SPD from overheating due to increased leakage currents and an external fuse to protect the SPD from higher fault currents. Different SPD technologies may avoid the use of the internal thermal disconnector because, in the event of failure, they change their operation mode to a low ohmic resistance.

SPDs may use one or more active voltage switching/limiting components, such as a varistor or gas discharge tube, to provide overvoltage protection. These active voltage switching/limiting components may degrade at a rapid pace as they approach the end of their operational lifespans, which may result in their exhibiting continuous short circuit behavior.

Some embodiments of the inventive concept stem from a realization that fuses or circuit breakers used to protect surge protective devices (SPDs) from short circuit currents when they fail by disconnecting them from the circuit have generally very high current ratings. These high current ratings may allow the fuses or circuit breakers to handle high impulse voltages and/or impulse currents from overvoltage events, such as lightning strikes, when configured in series with the SPD between the power line and ground or handle ongoing current when provided inline in the power line. To achieve such high current ratings, the fuses and/or circuit breakers may be large and require additional expense in installation.

According to some embodiments of the inventive concept, an SPD may be connected in series with a fuse assembly as disclosed herein (e.g., the fuse assembly 100) to form a fused SPD circuit. In some embodiments, the fused SPD circuit is provided in the form of a fused SPD unit or module, wherein the SPD and the fuse assembly are each integrated in the fused SPD unit or module. The fused SPD circuit may include a thermal disconnector device along with the SPD and the fuse assembly. The fused SPD circuit may include more than one SPD. The SPD may include one or more active switching components, such as a varistor or gas discharge tube. For example, in a power line application, the minimum short circuit current expected through the SPD may be in a range from 300 A-1000 A. This minimum short circuit current may be called a trigger current threshold. The short circuit current through the SPD and fuse assembly may also be called a trigger current. A standard for protecting SPDs from short circuit current events may be that the SPD be disconnected from the circuit within 5 seconds of the SPD short circuit current event. Thus, when used in the example power line application, the fuse assembly may be configured such that the fuse assembly opens within 5 seconds to open the circuit in response to an SPD short circuit current of at least 300 A.

The fuse assembly may also be configured to handle very large SPD surge impulse currents that are generated due to overvoltage or current surge events, such as lightning strikes. An SPD may be required to re-direct a surge impulse current of up to 25 kA, which lasts between 1 ms to 5 ms, to ground. The fuse assembly, according to some embodiments of the inventive concept, may conduct such high currents for up to 5 ms without the fuse assembly opening the circuit.

The fuse assembly may conduct relatively low currents therethrough corresponding to the leakage current associated with a varistor in an SPD. These leakage currents may be relatively low, such as, for example, 1 A-15 A. The fuse assembly may be configured so that the fuse assembly open the circuit before the SPD heats up sufficiently that a thermal disconnector opens the circuit to terminate the leakage current.

Figure 13:
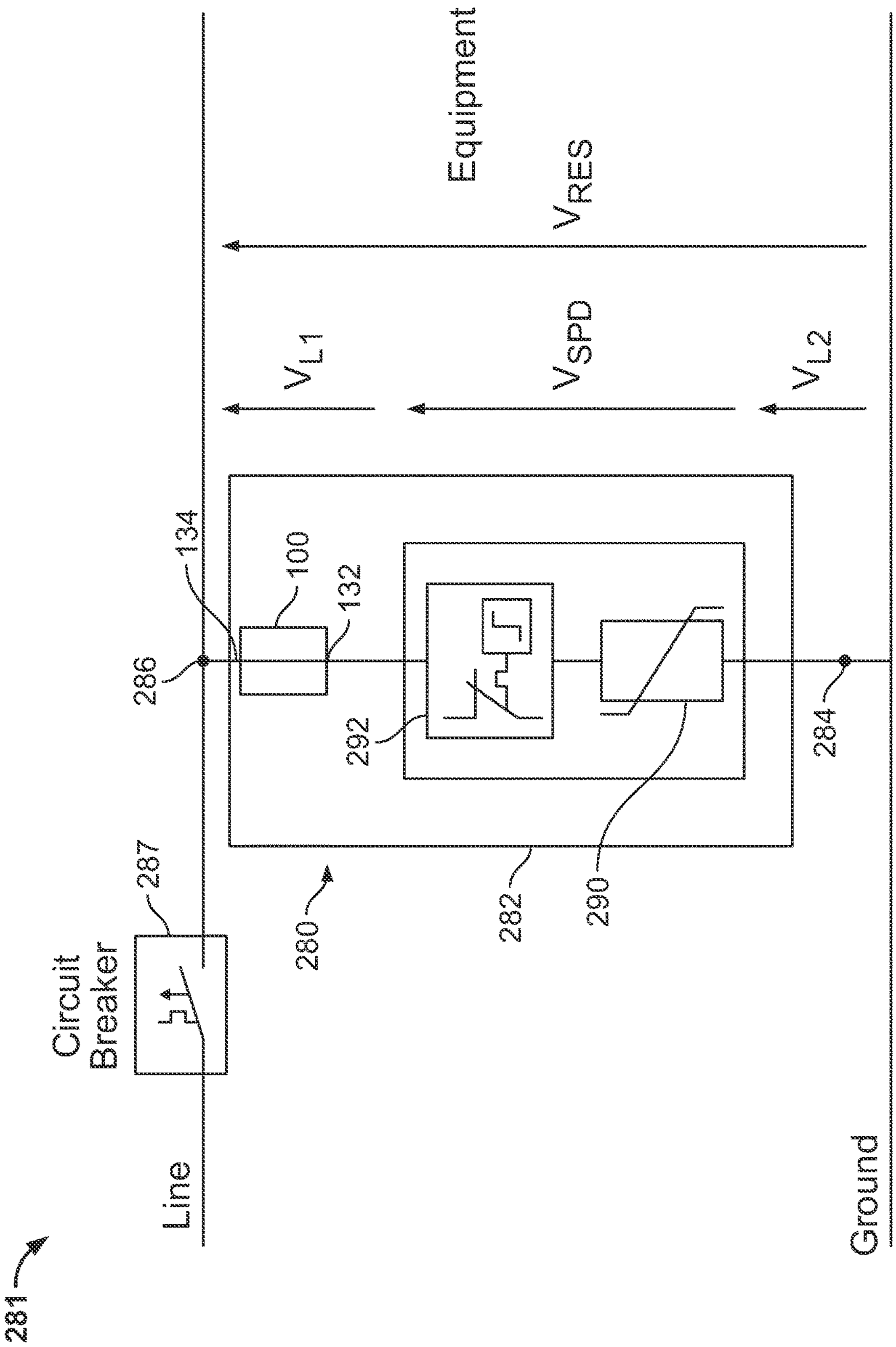
FIG. 13 is a schematic diagram representing an electrical power supply circuit including the modular electrical fuse assembly of FIG. 1.

Referring now to FIG. 13, an electrical power supply installation or circuit 281 according to some embodiments includes an SPD configuration including an SPD 290 in series with the fuse assembly 100 connected in parallel across sensitive equipment. A thermal disconnector 292 is also connected in series with the fuse assembly 100 and in parallel across the sensitive equipment. The SPD 290 and the thermal disconnector 292 are designed to protect the sensitive equipment from overvoltages and current surges. The SPD 290 is also connected upstream to the power source via a second fuse or circuit breaker 287.

In some embodiments, the fuse assembly 100 is integrated into a fused surge protective device (SPD) unit or module 280 including the surge protective device (SPD) 290. In this case, the fuse assembly 100 operates as an integrated backup fuse. The fused SPD module 280 may also include the thermal disconnector 292. In other embodiments, the fuse assembly 100 may be provided, installed and used as an individual component in a protection circuit of a power supply circuit (e.g., not physically integrated with the SPD 290 or the thermal disconnector 292).

With reference to FIG. 13, the fused SPD module 280 includes the fuse assembly 100, a module housing 282, a first electrical terminal 284, a second electrical terminal 286, the (SPD) 290, and the thermal disconnector 292. The fuse assembly 100, the SPD 290, and the thermal disconnector 292 are disposed in the housing 282, and are electrically connected between the terminals 284 and 286 to form a fused SPD electrical circuit 281.

The SPD 290 may be any suitable SPD. In some embodiments, the SPD 290 is a varistor-based SPD (e.g., a metal oxide varistor (MOV) based SPD). In some embodiments, the SPD 290 is a gas discharge tube (GDT). The SPD 290 may also be another type of voltage-switching/limiting surge protective device. A circuit including an MOV, GDT, and/or other circuit elements, such as resistors, inductors, or capacitors may comprise an overvoltage protection circuit for use in the SPD 290.

Gas discharge tubes (GDTs) and metal oxide varistors (MOV) may be used in surge protection devices, but both GDTs and MOVs have advantages and drawbacks in shunting current away from sensitive electronic components in response to overvoltage surge events. For example, MOVs have the advantage of responding rapidly to surge events and being able to dissipate the power associated with surge events. But MOVs have the disadvantages of having increased capacitance relative to GDTs and passing a leakage current therethrough even in ambient conditions. MOVs may also have a decreased lifetime expectancy relative to GDTs. GDTs have the advantage of having extremely low to no leakage current, minimal capacitance, and an increased lifetime expectancy relative to MOVs. But GDTs are not as responsive to surge events as MOVs. Moreover, when a GDT fires and transitions into the arc region in response to a surge event, the GDT may remain in a conductive state if the ambient voltage on the line to which the GDT is connected exceeds the arc voltage. The GDT may mitigate current leakage issues associated with the MOV, which may extend the working life of the MOV.

A GDT is a sealed device that contains a gas mixture trapped between two electrodes. The gas mixture becomes conductive after being ionized by a high voltage spike. This high voltage that causes the GDT to transition from a non-conducting, high impedance state to a conducting state is known as the sparkover voltage for the GDT. The sparkover voltage is commonly expressed in terms of a rate of rise in voltage over time. For example, a GDT may be rated so as to have a DC sparkover voltage of 500 V under a rate of rise of 100 V/s. When a GDT experiences an increase in voltage across its terminals that exceeds its sparkover voltage, the GDT will transition from the high impedance state to a state known as the glow region. The glow region refers to the time region where the gas in the GDT starts to ionize and the current flow through the GDT starts to increase. During the glow region, the current through the GDT will continue to increase until the GDT transitions into a virtual short circuit known as the arc region. The voltage developed across a GDT when in the arc region is known as the arc voltage and is typically less than 100 V. A GDT takes a relatively long time to trigger a transition from a high impedance state to the arc region state where it acts as a virtual short circuit.

A varistor, such as a MOV, when in a generally non-conductive state still conducts a relatively small amount of current caused by reverse leakage through diode junctions. This leakage current may generate a sufficient amount of heat that a device, such as the thermal disconnector 292, is used to reduce the risk of damage to components of the fused SPD 280. When a transient overvoltage event occurs, a varistor will conduct little current until reaching a clamping voltage level at which point the varistor will act as a virtual short circuit. Typically, the clamping voltage is relatively high, e.g., several hundred volts, so that when a varistor passes a high current due to a transient over voltage event a relatively large amount of power may be dissipated. In contrast to a GDT, a varistor has a relatively short transition time from a high impedance state to the virtual short circuit state corresponding to the time that it takes for the voltage developed across the varistor to reach the clamping voltage level.

The thermal disconnector 292 may be any suitable thermal disconnector device configured and positioned to disconnect the SPD 290 from the terminal 284 in response to heat generated by the SPD 290. The thermal disconnector 292 may include a spring-loaded switch having a solder connection that is melted or softened by excess heat from the SPD 290 (e.g., generated by an MOV thereof) to permit the switch to open.

The fuse assembly 100 and the fused SPD assembly 280 may operate as follows in service.

According to some embodiments of the inventive concept, the fused SPD 280 may be configured to operate under four different conditions: 1) normal operation; 2) an overvoltage or current surge event in which the fused SPD 280 is designed to shunt an SPD surge impulse current to ground; 3) an ambient leakage current event associated with the SPD 290 (e.g., associated with diode junctions of a varistor of the SPD 290); and 4) a short circuit event in which the SPD 290 degrades at the end of its lifecycle and begins acting operating as a short circuit.

Figure 3:
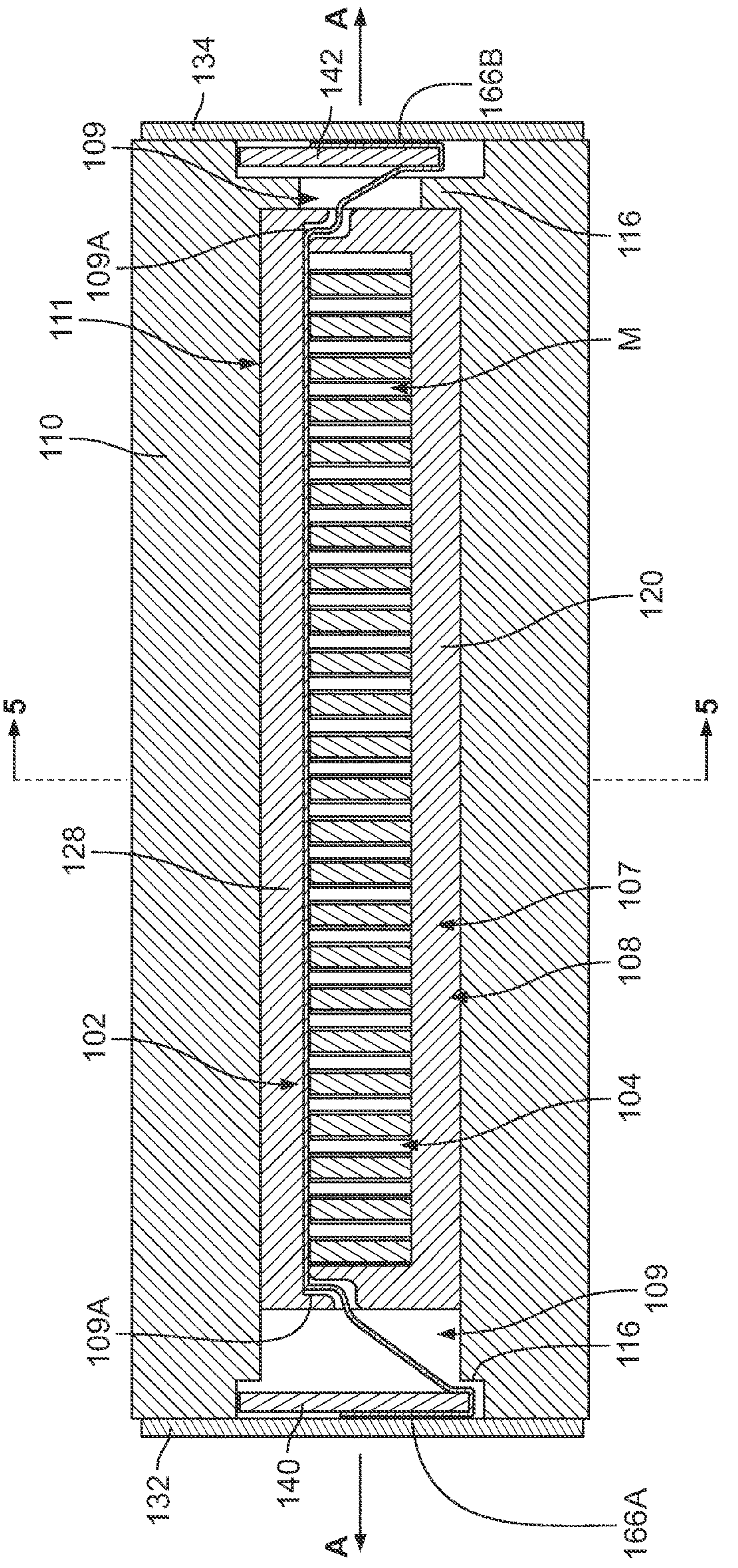
FIG. 3 is cross-sectional view of the modular electrical fuse assembly of FIG. 1 taken along the line 3-3 of FIG. 1.
Figure 4:
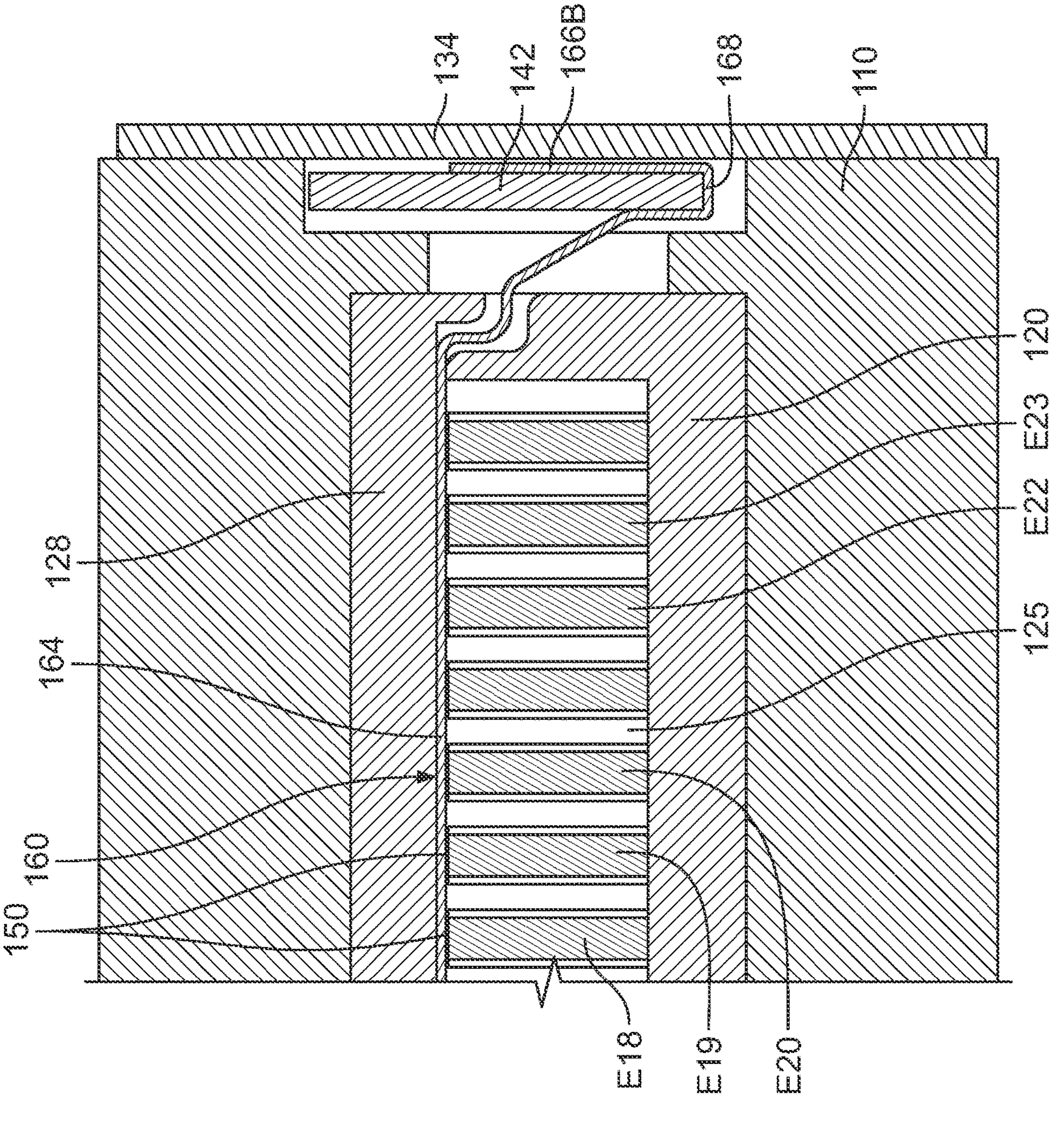
FIG. 4 is an enlarged, fragmentary, cross-sectional view of the modular electrical fuse assembly of FIG. 1 taken along the line 3-3 of FIG. 1.
Figure 5:
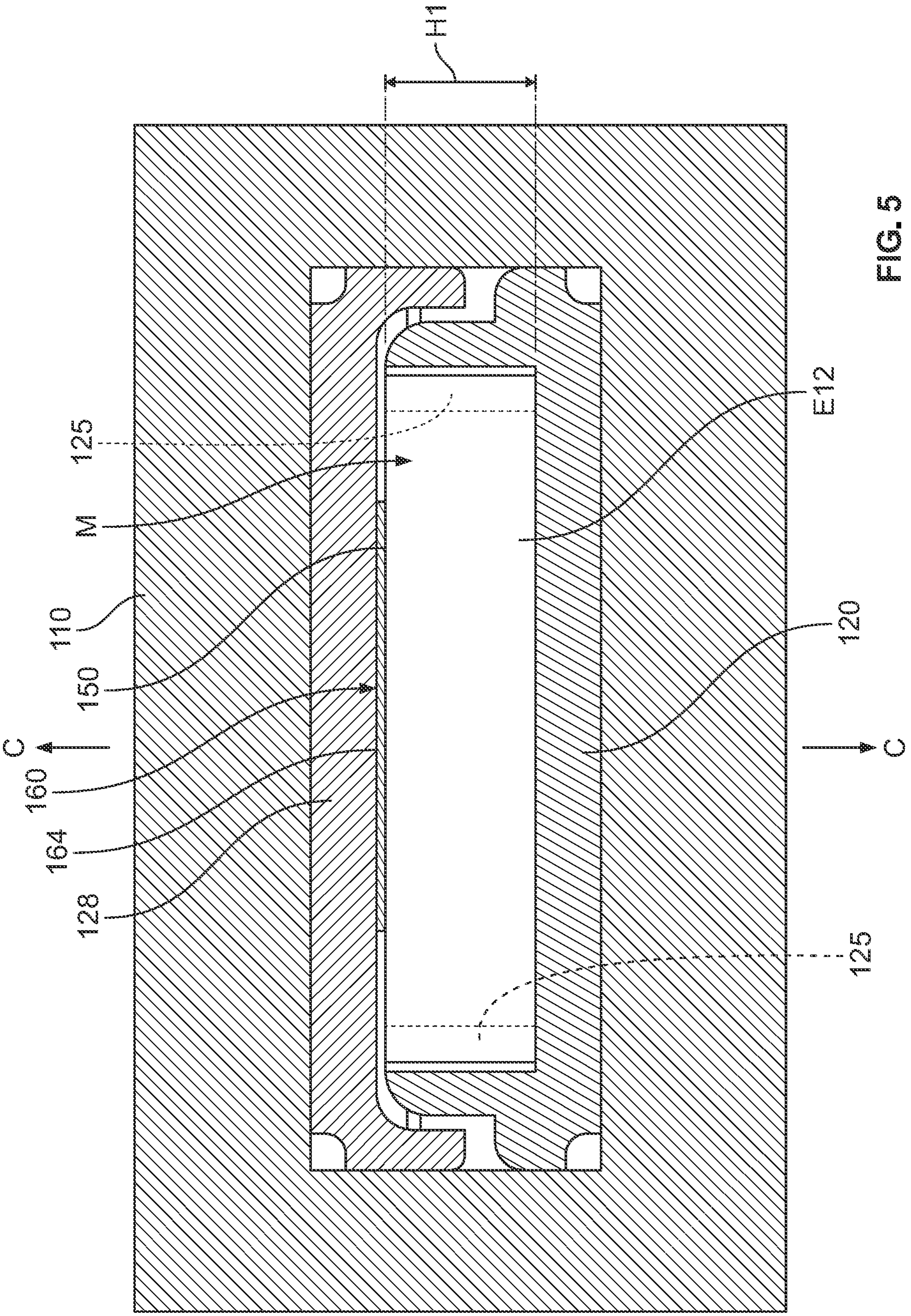
FIG. 5 is cross-sectional view of the modular electrical fuse assembly of FIG. 1 taken along the line 5-5 of FIG. 3.

The fused SPD module 280 is constructed and installed with the fuse assembly 100 in the configuration shown in FIGS. 3 and 10. The terminal 286 is electrically connected to the Line (L) of the circuit 281, and the terminal 284 is electrically connected to the Ground (G) of the circuit 281.

As discussed above, during normal operation, the SPD 290 does not let current through, and the fuse assembly 100 therefore is not supplied with a current. The fuse assembly 100 remains in the configuration shown in FIG. 3.

As discussed above, when an overvoltage or current surge event applies a surge impulse current to the circuit 281, the SPD 290 will effectively become a short circuit, and the fuse assembly 100 is supplied with an SPD surge impulse current. The SPD 290 (e.g., varistor or GDT) is designed to shunt the surge impulse current associated with such events to ground to protect sensitive equipment. The SPD surge impulse current may be on the order of tens of kA, but will typically last only a short duration (in the range of from about tens of microseconds to a few milliseconds.

The fuse element 160 is capable of conducting this SPD surge impulse current without disintegrating the fuse element 160. The fuse assembly 100 remains in the configuration shown in FIG. 3. The fuse assembly 160 therefore will not interrupt the SPD surge impulse current, and will remain usable for further operation. Accordingly, the fuse assembly 100 may be configured to carry the SPD surge impulse current therethrough without the fuse element 160 disintegrating to open the circuit. In some embodiments of the inventive concept, the fuse assembly 100 may be configured to carry therethrough an SPD surge impulse current of up to 25 kA for a time of up to 5 ms, a 25 kA 8/20 impulse waveform, and/or 25 kA 10/350 impulse waveform without the fuse link or element 160 disintegrating to open the circuit.

As discussed above, when the SPD 290 fails with a relatively small SPD leakage current (i.e., an ambient leakage current event associated with a varistor of the SPD 290), the fuse assembly 100 is supplied with the SPD leakage current. However, the fuse element 160 is capable of conducting this SPD leakage current for a minimum leakage current time threshold without disintegrating the fuse element 160 to open the circuit. The fuse assembly 100 remains in the configuration shown in FIG. 3. The fuse assembly 160 therefore will not interrupt the SPD leakage current, and will remain usable for further operation. The SPD 290 may further degrade and generate progressively more heat until the thermal disconnect 292 responds to the heat by opening and interrupting the current through the circuit 281. This leakage current is lower than the SPD short circuit trigger current for the fuse assembly 100. The leakage current in a power line application may be in a range from about 1 A-15 A. When the leakage current from the varistor is excessive it may cause heat buildup resulting in the thermal disconnector 292 opening the circuit to terminate the leakage current. The minimum leakage current time threshold may be set to be greater than a time at which the thermal disconnector 292 would open the circuit to terminate the leakage current.

As discussed above, the SPD 290 may fail as a short circuit in a manner and under circumstances that cause the SPD 290 to supply the fuse assembly 100 with a relatively high SPD short circuit current (e.g., in the range of from about hundreds of amps to tens of kA). This may occur when a varistor of the SPD 290 degrades, for example and acts as a short circuit.

The fuse assembly 100 is configured to open based on the minimum short circuit current that the SPD is expected to deliver when the SPD fails as a short circuit, which is based on the application. The minimum expected short circuit current may be called a threshold short circuit current or a trigger current of the fuse assembly 100 (i.e., the prescribed trigger current threshold for which the fuse assembly 100 is rated or designed). In a power line application, for example, the minimum expected short circuit current or trigger current may be in a range of 300 A-1000 A.

In response to the SPD short circuit current exceeding the prescribed trigger current of the fuse assembly 100, the fuse assembly 100 will interrupt the current through the fuse assembly 100.

Thus, for a power line application, the fuse assembly 100 may be configured such that the fuse element 160 remains intact as long as the SPD short circuit current or trigger current has not flowed through the fuse element 160 for greater than a maximum short circuit response time threshold. In power line applications, this maximum short circuit response time threshold may be set by regulation or standard to 5 seconds.

Some embodiments have been described herein in which the fuse assembly 100 is connected in parallel with the sensitive equipment to be protected from an overvoltage event as shown in FIG. 13. Because the fuse element 160 in the fuse assembly 100 may be configured to carry current at levels associated with a normal power line operating voltage and equipment current draw without disintegrating, the fuse assembly 100 may, in other embodiments, be placed in series with the equipment to be protected from overvoltage events. The fuse element 160 in the fuse assembly 100 may provide a wider operating range as compared with conventional fuse used to protect sensitive equipment from large current surges, such as lightning strikes. For example, a conventional fuse that is designed to withstand a 10/350 μs impulse current at a level of 25 kA is typically rated at 250 A. Typically, such a fuse will start to trip at relatively high short circuit or fault currents starting at 400 A (in 3 hours or less) and at 1650 A (in 5 seconds or less). By contrast, the fuse element 160, according to some embodiments, may withstand a surge, e.g., lightning, current of 25 kA, but may also trip within 5 seconds at around 300 A. Thus, the operating or tripping current range of the fuse element 160 is wider than a conventional fuse element, which may improve safety. The fuse assembly 100 including the fuse element 100, therefore, may be installed in locations with low short circuit currents, such as those with short circuit currents of around 300 A. According to IEC installation standards, a fuse should clear a short circuit or fault current within 5 seconds. As the fuse assembly 100 including the fuse element 160 is configured to trip within 5 seconds at around 300 A, the fuse assembly 100 can be used in installations with short circuit currents as low as 300 A, which is significantly lower than the 1650 A capability of conventional fuses. Thus, the fuse assembly 100 including the fuse element 160 may improve the safety of installations having relatively low short circuit currents.

Figure 14:
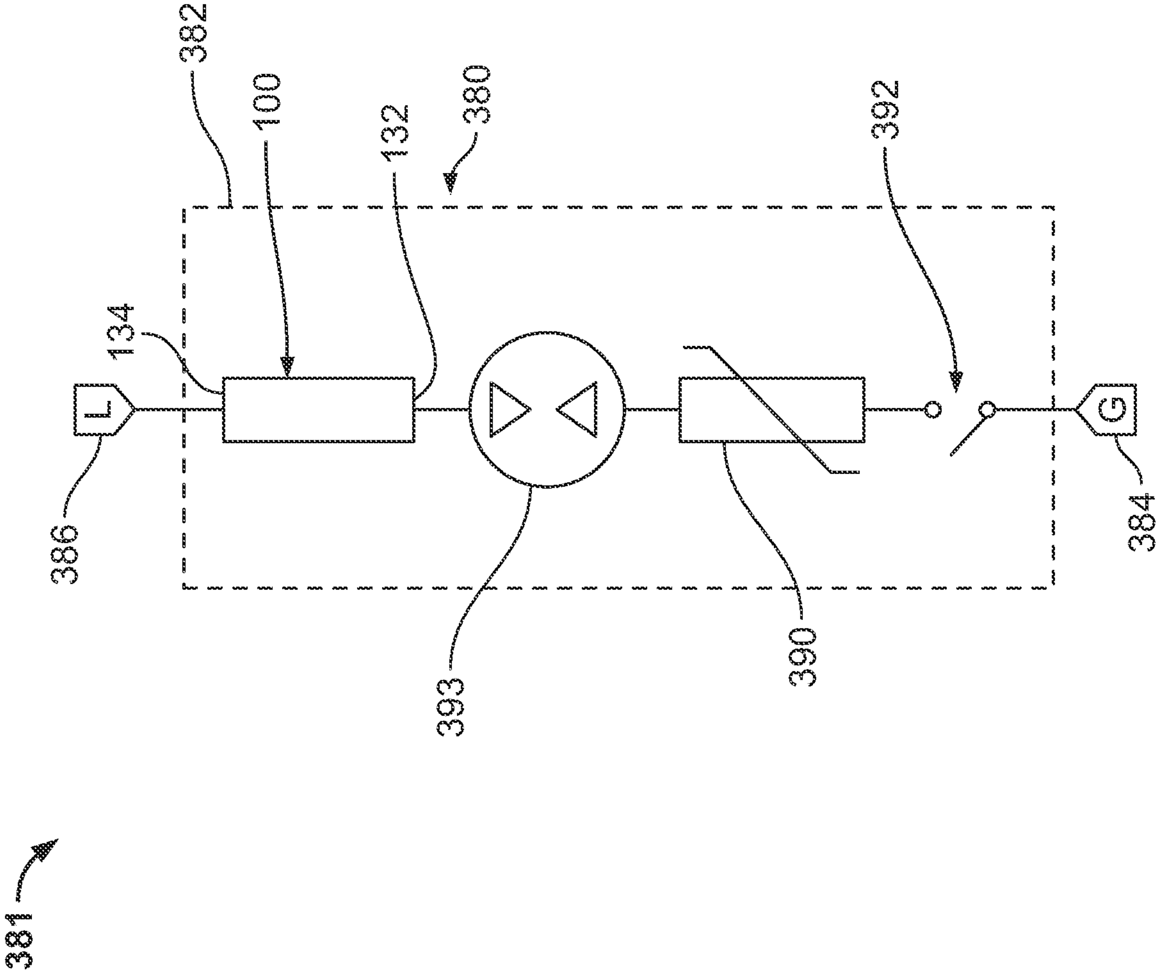
FIG. 14 is a schematic diagram representing a fused SPD module including the modular electrical fuse assembly of FIG. 1.

Referring to FIG. 14, a fused SPD circuit 381, and a fused SPD module 380 forming the circuit 381, according to further embodiments of the inventive concept are shown therein. The fused SPD module 380 includes the fuse assembly 100, a module housing 382, a first electrical terminal 384, a second electrical terminal 386, a varistor-based SPD 390 (e.g., including an MOV), a GDT 393, and a thermal disconnector 392. The fused SPD circuit 381 and fused SPD module 380 may be constructed and operate as described for the circuit 281 and module 280, except as follows. The fused SPD circuit 381 and fused SPD module 380 differ from the circuit 281 and module 280 in that the varistor of the varistor-based SPD 390 and the GDT 393 are provided in electrical series with the fuse assembly 100 and, in some embodiments, with the thermal disconnector 392.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An electrical fuse assembly comprising:
- a housing defining a hermetically sealed chamber;
- first and second terminal electrodes mounted on the housing;
- a gas contained in the hermetically sealed chamber;
- a fuse element electrically connecting the first and second terminal electrodes; and
- a plurality of inner electrodes serially disposed in the hermetically sealed chamber in spaced apart relation to define a series of spark gaps from the first terminal electrode to the second terminal electrode;
- wherein the fuse element and the spark gaps are disposed in the hermetically sealed chamber; and
- wherein:
  - the plurality of inner electrodes define a series of cells each containing a respective one of the plurality of the spark gaps; and
  - an inner surface of the fuse element is contiguous with the cells.

2. The electrical fuse assembly of claim 1 wherein the plurality of inner electrodes includes at least three inner electrodes defining at least two spark gaps.

3. The electrical fuse assembly of claim 1 wherein the fuse element and the inner electrodes are in fluid communication with the gas contained in the hermetically sealed chamber.

4. The electrical fuse assembly of claim 1 wherein the fuse element is in electrical contact with the inner electrodes in the hermetically sealed chamber.

5. A protected electrical power supply circuit comprising:
- a surge protective device (SPD); and
- a fuse assembly connected in electrical series with the SPD, the fuse assembly including:
  - a housing defining a hermetically sealed chamber;
  - first and second terminal electrodes mounted on the housing;
  - a gas contained in the hermetically sealed chamber;
  - a fuse element electrically connecting the first and second terminal electrodes; and
  - a plurality of inner electrodes serially disposed in the hermetically sealed chamber in spaced apart relation to define a series of spark gaps from the first terminal electrode to the second terminal electrode;

wherein the fuse element and the spark gaps are disposed in the hermetically sealed chamber;

wherein:

the plurality of inner electrodes define a series of cells each containing a respective one of the plurality of the spark gaps; and an inner surface of the fuse element is contiguous with the cells; and wherein the fuse element is configured to disintegrate, and thereby interrupt the protected electrical power supply circuit, in response to a short circuit current from the SPD exceeding a prescribed trigger current of the fuse element for at least a prescribed duration.

6. The protected electrical power supply circuit of claim 5 wherein the prescribed trigger current is a minimum expected short circuit current delivered by the SPD when the SPD has failed as a short circuit.

7. A fused SPD module comprising:

first and second electrical terminals;

a module housing;

a surge protective device (SPD) mounted in the module housing; and a fuse assembly connected in electrical series with the SPD, the fuse assembly including:

a housing defining a hermetically sealed chamber;

first and second terminal electrodes mounted on the housing;

a gas contained in the hermetically sealed chamber;

a fuse element electrically connecting the first and second terminal electrodes; and a plurality of inner electrodes serially disposed in the hermetically sealed chamber in spaced apart relation to define a series of spark gaps from the first terminal electrode to the second terminal electrode;

wherein the fuse element and the spark gaps are disposed in the hermetically sealed chamber; and wherein:

the plurality of inner electrodes define a series of cells each containing a respective one of the plurality of the spark gaps; and an inner surface of the fuse element is contiguous with the cells.

8. The fused SPD module of claim 7 including a thermal disconnector in the module housing and connected in series with the SPD, the thermal disconnector mechanism being configured to electrically disconnect the first electrical terminal from the second electrical terminal responsive to a thermal event.

9. The electrical fuse assembly of claim 1 wherein:

the fuse element is configured for use in electrical series with a surge protective device (SPD) in an electrical power supply circuit; and the fuse element is configured to disintegrate, and thereby interrupt the protected electrical power supply circuit, in response to a short circuit current from the SPD exceeding a prescribed trigger current of the fuse element for at least a prescribed duration.

10. The electrical fuse assembly of claim 9 wherein the prescribed trigger current is a minimum expected short circuit current delivered by the SPD when the SPD has failed as a short circuit.

11. The electrical fuse assembly of claim 1 wherein the series of spark gaps electrically connects the first and second terminal electrodes in electrical parallel with the fuse element.

12. The protected electrical power supply circuit of claim 5 wherein the fuse element is in electrical contact with the inner electrodes.

13. The fused SPD module of claim 7 wherein the fuse element is in electrical contact with the inner electrodes.

* * * * *